United States Patent [19]

Moussa et al.

[11] Patent Number: 5,680,470
[45] Date of Patent: Oct. 21, 1997

[54] METHOD OF AUTOMATED SIGNATURE VERIFICATION

[76] Inventors: Ali Mohammed Moussa, 1302 Nelson Way, Sunnyvale, Calif. 94087; Chih Chan, 13301 Glen Brae Dr., San Jose, Calif. 95070

[21] Appl. No.: 483,942

[22] Filed: Jun. 7, 1995

Related U.S. Application Data

[63] Continuation of Ser. No. 169,654, Dec. 17, 1993, abandoned.

[51] Int. Cl.⁶ .................................................. G06K 9/00
[52] U.S. Cl. ................................. 382/119; 382/159
[58] Field of Search .......................... 382/123, 115, 382/119, 209, 218, 296, 298, 301, 155, 156, 159

[56] References Cited

U.S. PATENT DOCUMENTS

| | | | |
|---|---|---|---|
| Re. 34,161 | 1/1993 | Nakagawa et al. | 273/85 G |
| 3,906,444 | 9/1975 | Crane et al. | 340/146.3 |
| 3,956,734 | 5/1976 | Radcliffe | 340/146.3 |
| 3,983,535 | 9/1976 | Herbst et al. | 340/146.3 |
| 3,991,402 | 11/1976 | Radcliffe, Jr. | 340/146.3 |
| 4,005,878 | 2/1977 | Van Leer | 283/8 |
| 4,028,674 | 6/1977 | Chuang | 340/146.3 |
| 4,078,226 | 3/1978 | EerNisse et al. | 340/146.3 |
| 4,111,052 | 9/1978 | Sniderman | 73/432 |
| 4,128,829 | 12/1978 | Herbst et al. | 340/146.3 |
| 4,131,880 | 12/1978 | Siy et al. | 340/146.3 |
| 4,142,175 | 2/1979 | Herbst et al. | 340/146.3 |
| 4,143,357 | 3/1979 | Baver et al. | 340/146.3 |
| 4,190,820 | 2/1980 | Crane et al. | 340/146.3 |
| 4,201,978 | 5/1980 | Nally | 340/146.3 |
| 4,202,626 | 5/1980 | Mayer, Jr. et al. | 355/52 |
| 4,216,374 | 8/1980 | Lam et al. | 371/127 |
| 4,221,063 | 9/1980 | Charles et al. | 40/21 C |
| 4,240,065 | 12/1980 | Howbrook | 340/146.3 |
| 4,264,782 | 4/1981 | Konheim | 178/22 |
| 4,281,313 | 7/1981 | Boldridge, Jr. | 340/146.3 |
| 4,285,146 | 8/1981 | Charles et al. | 40/21 C |
| 4,286,255 | 8/1981 | Siy | 340/146.3 |
| 4,308,522 | 12/1981 | Paganini et al. | 340/146.3 |
| 4,326,098 | 4/1982 | Bouricius et al. | 178/22.08 |
| 4,345,239 | 8/1982 | Elliott | 340/146.3 |
| 4,433,436 | 2/1984 | Carnes | 382/3 |
| 4,475,235 | 10/1984 | Graham | 382/3 |
| 4,495,644 | 1/1985 | Parks et al. | 382/3 |
| 4,513,437 | 4/1985 | Chainer et al. | 382/3 |
| 4,536,746 | 8/1985 | Gobeli | 340/365 A |
| 4,553,258 | 11/1985 | Chainer et al. | 382/3 |
| 4,553,259 | 11/1985 | Chainer et al. | 382/3 |
| 4,562,592 | 12/1985 | Chainer et al. | 382/3 |

(List continued on next page.)

FOREIGN PATENT DOCUMENTS

| | | | |
|---|---|---|---|
| 0 281 224 | 1/1988 | European Pat. Off. | H04L 9/00 |
| WO 95/16974 | 6/1995 | WIPO | G06K 9/00 |

OTHER PUBLICATIONS

Lam, et al., Signature Recognition Through Spectral Analysis, 1989, 1023 Pattern Recognition, pp.39–44.
Sato, et al., Online Signature Verification Based on Shape, Motion, and Writing Pressure, 1982, Proc. 6Th Int. Conf. On Pattern Recognition, pp. 823–826.

*Primary Examiner*—Joseph Mancuso
*Assistant Examiner*—Gerard Del Rosso
*Attorney, Agent, or Firm*—D'Alessandro & Ritchie

[57] ABSTRACT

A method of automated signature verification, in which a test signature, e.g., a signature entered by an operator, may be preprocessed and examined for test features. The test features may be compared against features of a set of template signatures, and verified in response to the presence or absence of the test features in the template signatures. The test signature may be preprocessed, so as to normalize it and remove artifacts which are irrelevant to verification. The features of the template signatures may be determined and stored in an associative memory or a data structure with associative memory capabilities, e.g., a discrete Hopfield artificial neural network. The method of verification may be adjusted to greater or lesser sensitivity in response to external conditions.

32 Claims, 14 Drawing Sheets

5,680,470

Page 2

U.S. PATENT DOCUMENTS

| | | | |
|---|---|---|---|
| 4,581,482 | 4/1986 | Rothfjell | 128/18 |
| 4,595,924 | 6/1986 | Gehman | 343/5 PD |
| 4,641,146 | 2/1987 | Gehman | 343/814 |
| 4,646,351 | 2/1987 | Asbo et al. | 382/3 |
| 4,653,097 | 3/1987 | Watanabe et al. | 381/42 |
| 4,680,801 | 7/1987 | Etherington et al. | 382/3 |
| 4,691,355 | 9/1987 | Wirstrom et al. | 380/23 |
| 4,694,492 | 9/1987 | Wirstrom et al. | 380/23 |
| 4,701,960 | 10/1987 | Scott | 382/3 |
| 4,718,102 | 1/1988 | Crane et al. | 382/13 |
| 4,720,860 | 1/1988 | Weiss | 380/23 |
| 4,724,542 | 2/1988 | Willford | 382/3 |
| 4,736,445 | 4/1988 | Gundersen | 382/3 |
| 4,752,965 | 6/1988 | Dunkley et al. | 382/3 |
| 4,759,073 | 7/1988 | Shah et al. | 382/8 |
| 4,776,020 | 10/1988 | Kosaka et al. | 382/1 |
| 4,789,934 | 12/1988 | Gundersen et al. | 364/419 |
| 4,791,343 | 12/1988 | Ahrendt | 318/696 |
| 4,797,672 | 1/1989 | Kousa | 340/825.3 |
| 4,799,258 | 1/1989 | Davies | 380/21 |
| 4,800,590 | 1/1989 | Vaughan | 380/25 |
| 4,856,062 | 8/1989 | Weiss | 380/23 |
| 4,856,077 | 8/1989 | Rothfjell | 382/3 |
| 4,881,264 | 11/1989 | Merkle | 380/25 |
| 4,897,867 | 1/1990 | Foster et al. | 379/94 |
| 4,901,358 | 2/1990 | Bechet | 382/3 |
| 4,903,991 | 2/1990 | Wright | 283/95 |
| 4,905,143 | 2/1990 | Takahashi et al. | 364/200 |
| 4,910,525 | 3/1990 | Stulken | 342/418 |
| 4,918,733 | 4/1990 | Daugherty | 381/43 |
| 4,963,859 | 10/1990 | Parks | 340/712 |
| 4,969,189 | 11/1990 | Ohta et al. | 380/25 |
| 4,972,562 | 11/1990 | Tanaka et al. | 28/190 |
| 4,991,205 | 2/1991 | Lemelson | 380/5 |
| 4,993,068 | 2/1991 | Piosenka et al. | 380/23 |
| 5,005,200 | 4/1991 | Fischer | 380/30 |
| 5,005,205 | 4/1991 | Ellozy et al. | 382/3 |
| 5,013,874 | 5/1991 | De Bruyne et al. | 178/18 |
| 5,018,208 | 5/1991 | Gladstone | 382/3 |
| 5,022,086 | 6/1991 | Crane et al. | 382/2 |
| 5,025,491 | 6/1991 | Tsuchiya et al. | 340/825.52 |
| 5,027,414 | 6/1991 | Hilton | 382/3 |
| 5,040,215 | 8/1991 | Amano et al. | 381/43 |
| 5,040,222 | 8/1991 | Muroya | 382/3 |
| 5,042,073 | 8/1991 | Collot et al. | 382/3 |
| 5,046,019 | 9/1991 | Basehore | 364/513 |
| 5,054,088 | 10/1991 | Gunderson et al. | 382/3 |
| 5,073,939 | 12/1991 | Vensko et al. | 381/43 |
| 5,091,975 | 2/1992 | Berger et al. | 382/56 |
| 5,097,505 | 3/1992 | Weiss | 380/23 |
| 5,103,486 | 4/1992 | Grippi | 382/4 |
| 5,107,541 | 4/1992 | Hilton | 382/3 |
| 5,109,426 | 4/1992 | Parks | 382/3 |
| 5,111,004 | 5/1992 | Gullman | 178/18 |
| 5,111,512 | 5/1992 | Fan et al. | 382/3 |
| 5,131,055 | 7/1992 | Chao | 382/32 |
| 5,136,590 | 8/1992 | Polstra et al. | 371/16.2 |
| 5,138,889 | 8/1992 | Conrad | 73/863.12 |
| 5,159,321 | 10/1992 | Masaki et al. | 340/706 |
| 5,164,988 | 11/1992 | Matyas et al. | 380/25 |
| 5,168,520 | 12/1992 | Weiss | 380/23 |
| 5,177,789 | 1/1993 | Covert | 380/23 |
| 5,199,068 | 3/1993 | Cox | 380/23 |
| 5,202,930 | 4/1993 | Livshitz et al. | 382/3 |
| 5,226,809 | 7/1993 | Franco | 24/704.1 |
| 5,237,408 | 8/1993 | Blum et al. | 358/108 |
| 5,237,614 | 8/1993 | Weiss | 380/23 |
| 5,251,265 | 10/1993 | Döhle et al. | 382/3 |
| 5,257,320 | 10/1993 | Etherington et al. | 382/3 |
| 5,299,269 | 3/1994 | Gaborski et al. | 382/9 |
| 5,341,422 | 8/1994 | Blackledge, Jr. et al. | 380/4 |
| 5,355,420 | 10/1994 | Bloomberg et al. | 382/296 |
| 5,361,062 | 11/1994 | Weiss et al. | 340/825.33 |
| 5,371,797 | 12/1994 | Bocinsky, Jr. | 380/24 |
| 5,373,559 | 12/1994 | Kaufman et al. | 380/30 |
| 5,410,492 | 4/1995 | Gross et al. | 364/492 |
| 5,414,833 | 5/1995 | Hershey et al. | 395/575 |
| 5,422,959 | 6/1995 | Lee | 382/119 |
| 5,450,491 | 9/1995 | McNair | 380/25 |
| 5,455,892 | 10/1995 | Minot et al. | 395/23 |
| 5,459,675 | 10/1995 | Gross et al. | 364/492 |
| 5,461,924 | 10/1995 | Calderara et al. | 73/786 |
| 5,469,506 | 11/1995 | Berson et al. | 380/23 |
| 5,479,531 | 12/1995 | Webster | 382/119 |
| 5,481,611 | 1/1996 | Owens et al. | 380/25 |
| 5,485,519 | 1/1996 | Weiss | 380/23 |
| 5,491,752 | 2/1996 | Kaufman et al. | 380/30 |
| 5,508,687 | 4/1996 | Gebhardt et al. | 340/825.31 |
| 5,537,489 | 7/1996 | Sinden et al. | 382/296 |
| 5,559,895 | 9/1996 | Lee et al. | 382/119 |

METHOD OF AUTOMATED SIGNATURE VERIFICATION

CROSS-REFERENCE TO RELATED APPLICATION

This is a file-wrapper continuation of patent application Ser. No. 08/169,654, filed Dec. 17, 1993, now abandoned.

BACKGROUND OF THE INVENTION

1. Field of the Invention

This invention relates to signature verification.

2. Description of Related Art

In a variety of applications, methods for verifying that a person seeking access is in fact authorized are often required. For example, keys are commonly used to require some form of authentication before entry to a building or a vehicle is permitted. Where access is desired to software programs or to software-controlled devices (such as an automated bank teller or credit card account) access is often verified by requiring that the person seeking access enter a password or personal identifier number ("PIN"), or by requiring that such information be recorded on a magnetic strip or in the memory of a "smart" card.

While these methods of the prior art achieve the goal of limiting access, they are subject to several drawbacks. (1) Passwords and PINs may be forgotten, leading to persons who are authorized but cannot achieve access. (2) Passwords and PINs are often chosen without security considerations in mind (they are often chosen to be easily remembered), or are too short, leading security systems which depend upon them to be subject to attack by testing likely keys. (3) Magnetic cards or "smart" cards may be lost or stolen, leading to persons who can achieve access but are not authorized.

It would be advantageous to have a method of authorization which allows verification in response to the signature of the person seeking access. However, known methods of signature matching generally require costly human review of the signature. Accordingly, it is an object of the invention to provide a method of automated signature verification.

SUMMARY OF THE INVENTION

The invention provides a method of automated signature verification, in which a test signature, e.g., a signature entered by an operator, may be preprocessed and examined for test features. The test features may be compared against features of a set of template signatures, and verified in response to the presence or absence of the test features in the template signatures. In a preferred embodiment, the test signature may be preprocessed, so as to normalize it and remove artifacts which are irrelevant to verification. In a preferred embodiment, the features of the template signatures may be determined and stored in an associative memory or a data structure with associative memory capabilities, e.g., a discrete Hopfield artificial neural network. In a preferred embodiment, the method of verification may be adjusted to greater or lesser sensitivity in response to external conditions.

DESCRIPTION OF THE PREFERRED EMBODIMENT

Figure 1:
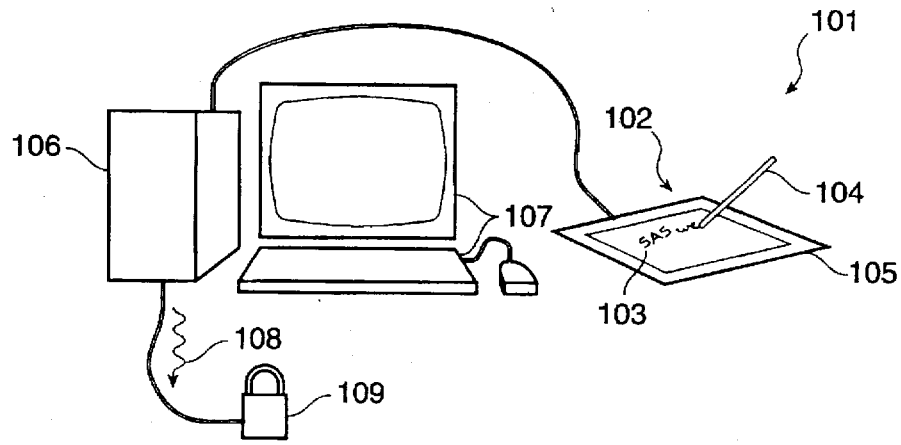
FIG. 1 shows an example system in which automated signature verification is used to control entry.

FIG. 1 shows an example system in which automated signature verification is used to control entry.

An automated signature verification system 101 may comprise an input device 102 for receipt of an input signature 103, such as a writing implement 104 and a pressure plate 105, coupled to a processor 106 for receiving data relating to the input signature 103. In a preferred embodiment, the writing implement 104 and pressure plate 105 may comprise a stylus and graphics tablet for freehand computer input, in which the location of the stylus on the tablet and the pressure then exerted are periodically transmitted to the processor 106, as are known in the art (such as the "Acecat" graphics tablet made by ACECAD of Monterey, Calif.). However, it would be clear to those skilled in the art, after perusal of this application, that other types of input device would also be workable, and are within the scope and spirit of the invention.

In a preferred embodiment, the processor 106 may comprise a system having a processor, memory comprising a stored program, memory comprising data, and input/output devices 107, as is well known in the art. The operation and software structures of this system are described herein in terms of their functions and at a level of detail which would be clear to those of ordinary skill in the art. It would be clear to anyone of ordinary skill in the art, after perusal of this application, that modification and/or programming (using known programming techniques) of a processor of known design to achieve these functions would be a straightforward task and would not require undue experimentation. It would also be clear to those skilled in the art, after perusal of this application, that processors of other types could be adapted to methods shown herein without undue experimentation, and that such other types of processor are within the scope and spirit of the invention.

In response to the input signature 103, the processor 106 may generate a verification signal 108, which may be used to verify the identity of the person writing the input signature 103. This verification signal 108 may be viewed by an operator, may be coupled directly to a locking device 109, or may be coupled to software within the processor 106 (or within another processor). In a preferred embodiment, the verification signal 108 may be combined with other methods for verifying the identity of the person, such as methods which are already known in the art.

SIGNATURE INPUT, STORAGE AND LATER VERIFICATION

Figure 2:
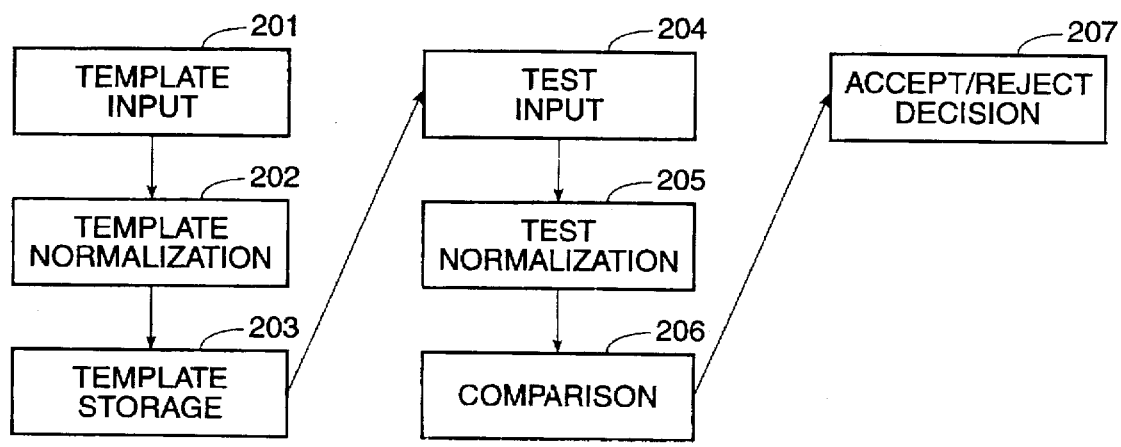
FIG. 2 shows a process flow chart of a method of automated signature verification.

FIG. 2 shows a process flow chart of a method of automated signature verification.

A method of automated signature verification may comprise a template input step 201, a template normalization step 202, a template storage step 203, a test input step 204, a test normalization step 205, a comparison step 206, and an accept-reject decision step 207.

As shown herein, the method may use a system as described with reference to FIG. 1, and may proceed by recording a set of template signatures, which are known to be valid signatures, and may be used later for comparison with a test signature. In a preferred embodiment, the set of template signatures may comprise at least five individual signatures. These template signatures are each input and normalized, and stored for later comparison. The method may then proceed, when verification of a person's identity is desired, to verify a test signature. The test signature is input and normalized, compared with the template signatures, and accepted or rejected in response to that comparison.

In the template input step 201, the person whose identity is to be verified later may write a set of template input signatures 103 on the input device 102, e.g., by handwriting the input signature 103 with the writing implement 104 on the pressure plate 105. The template input signatures 103 are known to be valid signatures, and may be used later for comparison with the test input signature 103.

At the template input step 201, the identity of the person may be explicitly identified to the system, e.g., by means of an additional input device 107, e.g., a text input device such as a keyboard, or by means of other input devices such as a mouse or other pointing device, voice input, photographic or other graphic input, or by other means of data input which are known in the art. However, it is not required that the identity of the person be explicitly identified, e.g., the system may compare a test input signature 103 with all recorded template signatures, and generate the verification signal 108 if there is a match with any stored set of template signatures.

In a preferred embodiment, data transmitted by the input device 107 to the processor 106 may be periodically retrieved by the processor 106, as is well known in the art, and stored in a data structure associated with the template input signature 103. In a preferred embodiment, the data may comprise a set of pixels, each of which may comprise a set of pixel data, organized into a data structure as shown in the following table. However, those skilled in the art would recognize, after perusal of this application, that other sets of data elements would be workable, and are within the scope and spirit of the invention.

$P_1 = \{X_1, Y_1, T_1, S_1, PR_1\}$
$P_2 = \{X_2, Y_2, T_2, S_2, PR_2\}$
$P_3 = \{X_3, Y_3, T_3, S_3, PR_3\}$
* * *
$P_n = \{X_n, Y_n, T_n, S_n, PR_n\}$ where $X_i$=X-coordinate of pixel, $Y_i$=Y-coordinate of pixel, $T_i$=time when pixel captured, $S_i$=pen-up/pen-down status of the writing implement 104 at that time, $PR_i$=pressure of the writing implement 104 at that time In the template normalization step 202, the processor 106 may convert the template input signature 103 into a normalized form. Use of a normalized form allows the processor 106 to remove features of the template input signature 103 which are deemed irrelevant to comparison with other signatures. Such irrelevant features may include noise introduced by the input device 102, orientation, and size.

In the template storage step 203, the template input signatures 103 may be stored for later comparison with a test signature. In a preferred embodiment, features of the template input signatures 103 may be determined in response to the template input signatures 103 and stored in a manner which allows associative memory retrieval.

In the test input step 204, the person whose identity is to be verified may write a test input signature 103 on the input device 102, in similar manner as the template input step 201. At the test input step 204, the identity of the person may be explicitly identified to the system in similar manner as in the template input step 108. At the test input step 204, the processor 106 may capture similar data as in the template input step 201.

In the test normalization step 205, the processor 106 may normalize the test input signature 103 in similar manner as the template normalization step 202 is performed for the template input signature 103.

In the comparison step 206, the processor 106 may compare the test input signature 103 with the stored template input signatures 103. In a preferred embodiment, features of the test input signature 103 may be determined with reference to the test input signature 103 and compared with the stored template input signatures 103 using associative memory retrieval.

In the accept/reject decision step 207, the processor 106 may determine whether to verify the person entering the test input signature 103 in response to the comparison step 206.

SIGNATURE NORMALIZATION

In a preferred embodiment, the template normalization step 202 and the test normalization step 205 may each include a smoothing step, a rotation step, and a resizing step.

Figure 3:
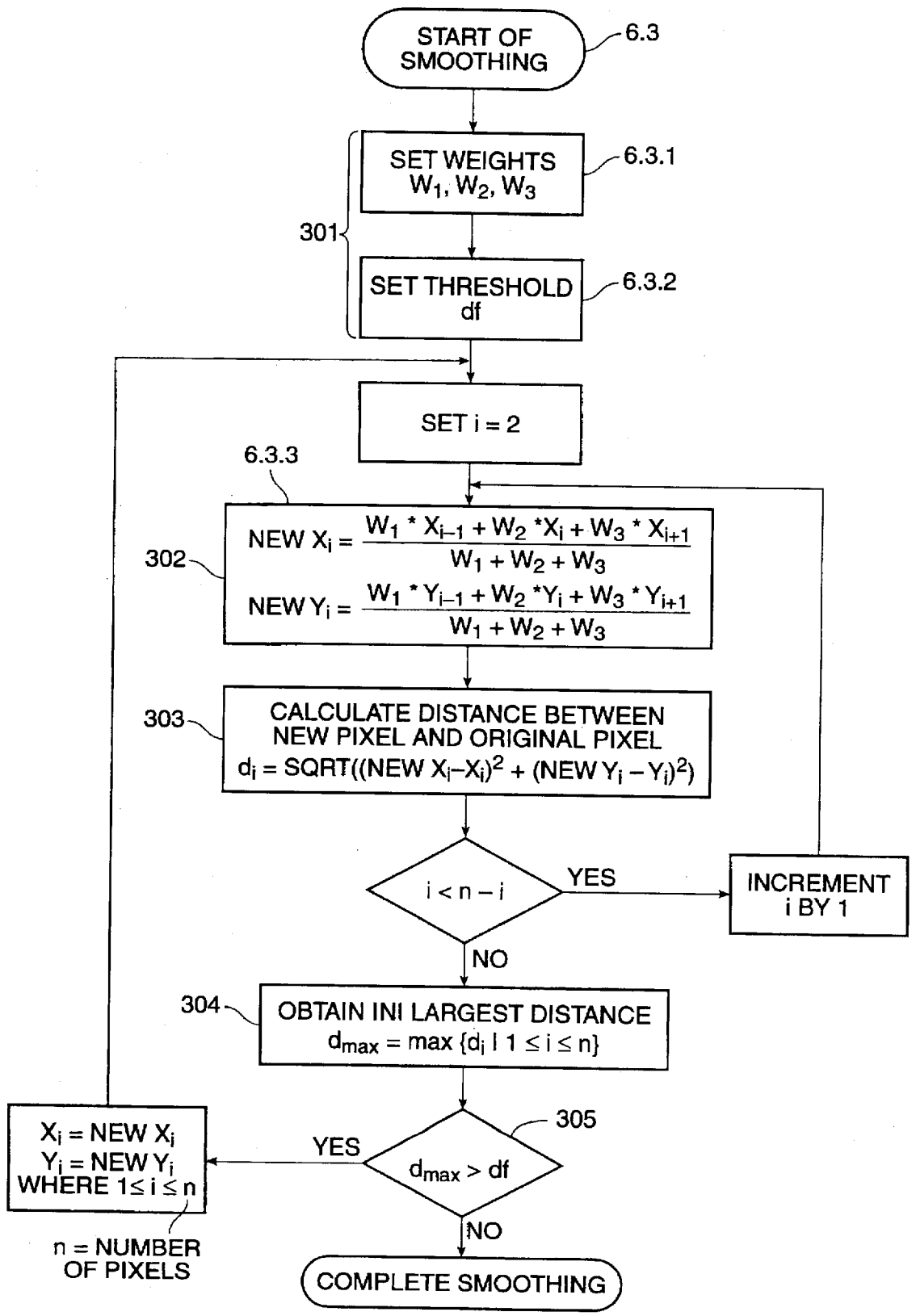
FIG. 3 shows a process flow chart of a method of signature smoothing.

FIG. 3 shows a process flow chart of a method of signature smoothing.

It may occur that data captured by the graphics tablet has a higher resolution than data which is transmitted to the processor 106, e.g., because the graphics tablet has a higher resolution than a graphics adapter used to transmit that data. This may result in two pixels being mapped to the same location on the graphics adapter, which in turn may cause the input signature 103 to appear not to be smooth, and may even cause strokes of the input signature 103 to appear to zigzag. Additionally, the manner in which the input signature 103 was written may cause it not to be smooth.

At an initialization step 301, a set of weights $w_1$, $w_2$ and $w_3$, and a threshold df, may be determined. A preferred value for $w_1$ may be 1, a preferred value for $w_2$ may be 2, a preferred value for $w_3$ may be 1, and a preferred value for df may be 4.

At a smooth-once step 302, each pixel value for $X_i$ and $Y_i$ may be smoothed by computing a weighted average of that pixel, its predecessor pixel, and its successor pixel, as follows:

$$\text{new } X_i = \frac{w_1 X_{i-1} + w_2 X_i + w_3 X_{i+1}}{w_1 + w_2 + w_3}$$

$$\text{new } Y_i = \frac{w_1 Y_{i-1} + w_2 Y_i + w_3 Y_{i+1}}{w_1 + w_2 + w_3}$$

The smooth-once step 302 may be performed for each pixel, except the first and last pixel. In a preferred embodiment, each pixel value for new $X_i$ and new $Y_i$ may be computed using old values for that pixel, its predecessor pixel, and its successor pixel.

At a compute-distance step 303, a distance $d_i$ for each pixel between the pre-smoothed pixel values for $X_i$ and $Y_i$ and the post-smoothed pixel values for $X_i$ and $Y_i$ may be computed. In a preferred embodiment, this distance may be computed using a standard Euclidean distance metric. The compute-distance step 303 may be performed for each pixel.

At a maximum-distance step 304, the maximum such distance for any pixel may be computed as follows:

$$d_{max} = max\{d_i | 1 \leq i \leq n\}$$

where n is the number of pixels.

At a distance-threshold step 305, the maximum distance $d_{max}$ is compared with the threshold df. If $d_{max}$ is not greater than df, the method of smoothing is complete. Otherwise, the method repeatedly assigns each pixel its new $X_i$ and $Y_i$ values, and then continues with the smooth-once step 302. Because the smooth-once step 302 causes the distance $d_i$ between a new pixel value and its previous value to become smaller, the value $d_{max}$ computed at the maximum-distance step 304 also becomes smaller, until it becomes smaller than the threshold df. Accordingly, the comparison at the distance-threshold step 305 will eventually show $d_{max}$ to be less than df, and the method of signature smoothing will eventually terminate (i.e., it will not proceed in an "infinite loop").

Figure 4A:
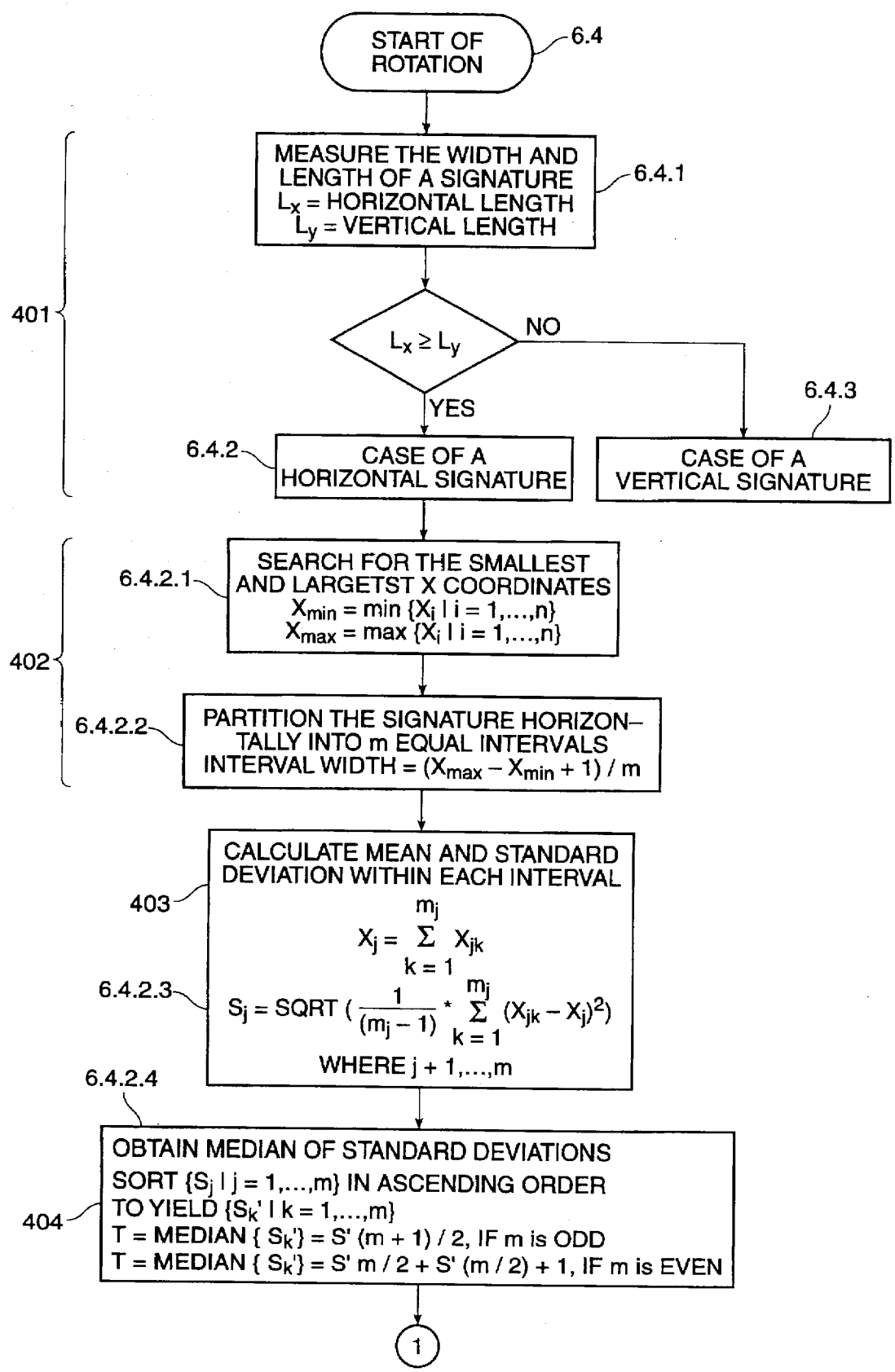
FIGS. 4A and 4B show a process flow chart of a method of signature rotation.
Figure 4B:
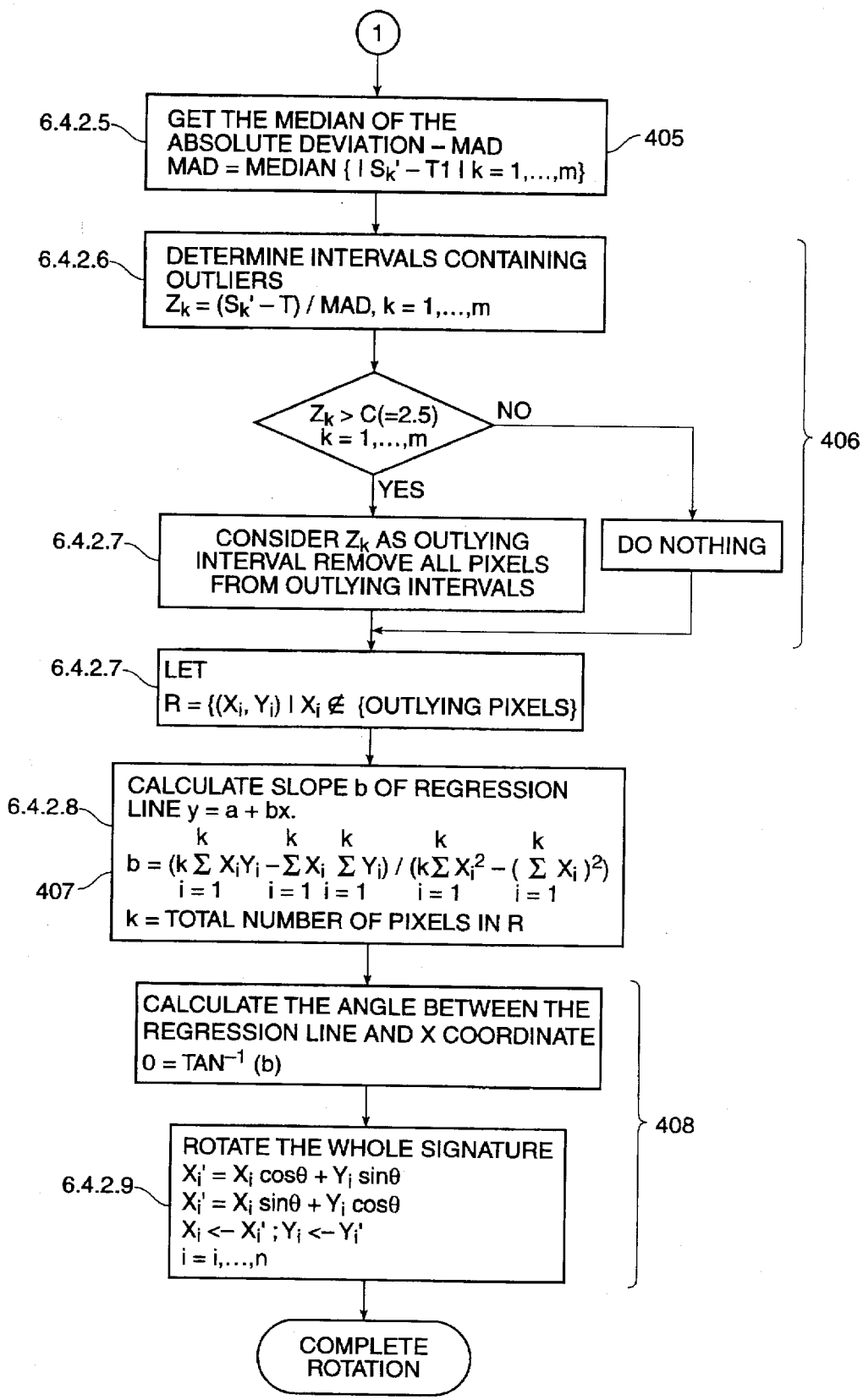

FIGS. 4A and 4B show a process flow chart of a method of signature rotation.

It may occur that the input signature 103 is written at an angle from what would normally be expected, either due to positioning of the graphics tablet, position of the person making the input signature 103, or the manner in which the input signature 103 was written. In a preferred embodiment, the angle of the input signature 103 is detected and the input signature 103 is rotated to align it with a horizontal or vertical axis.

At an orientation step 401, the orientation of the input signature 103 may be determined. In a preferred embodiment, the horizontal extent $L_x$ of the input signature 103 may be compared with the vertical extent $L_y$ of the input signature 103. If $L_x \geq L_y$, the input signature 103 is determined to be horizontal. Otherwise the input signature 103 is determined to be vertical. The remainder of the method of signature rotation is described with reference to a horizontal input signature 103, but treatment of a vertical input signature 103 would be clear to those skilled in the art after perusal of this application.

At a partition step 402, the input signature 103 may be partitioned into m equal intervals along the X axis. A preferred value for m may be 64. The smallest and largest X coordinates may be determined and the X interval for input signature 103 may be divided into m equal intervals. Each pixel may be assigned to one of these intervals.

At an interval-statistics step 403, the mean $X_j$ and standard deviation $S_j$ of the pixels in each interval j may be computed, using known statistical formulae. The median T of the standard deviations $S_j$ may be computed at step 404, using known statistical formulae. The median absolute deviation MAD of the standard deviations $S_j$ from T may be computed at step 405, using known statistical formulae.

At an outlier-detection step 406, outlying pixels are removed. Those intervals for which $(S_j-T)/MAD$ exceeds a threshold C are determined to be outliers. A preferred value for C may be 2.5.

At a regression step 407, a regression line may be computed for non-outlier pixels, using known statistical formulae. The regression line may have the form y=m x+b, and the angle of the slope regression line may be computed from its slope, using known geometric formulae.

At a rotate step 408, each pixel of the input signature 103 may be rotated to a new X coordinate and Y coordinate position, using known geometric formulae.

Figure 5:
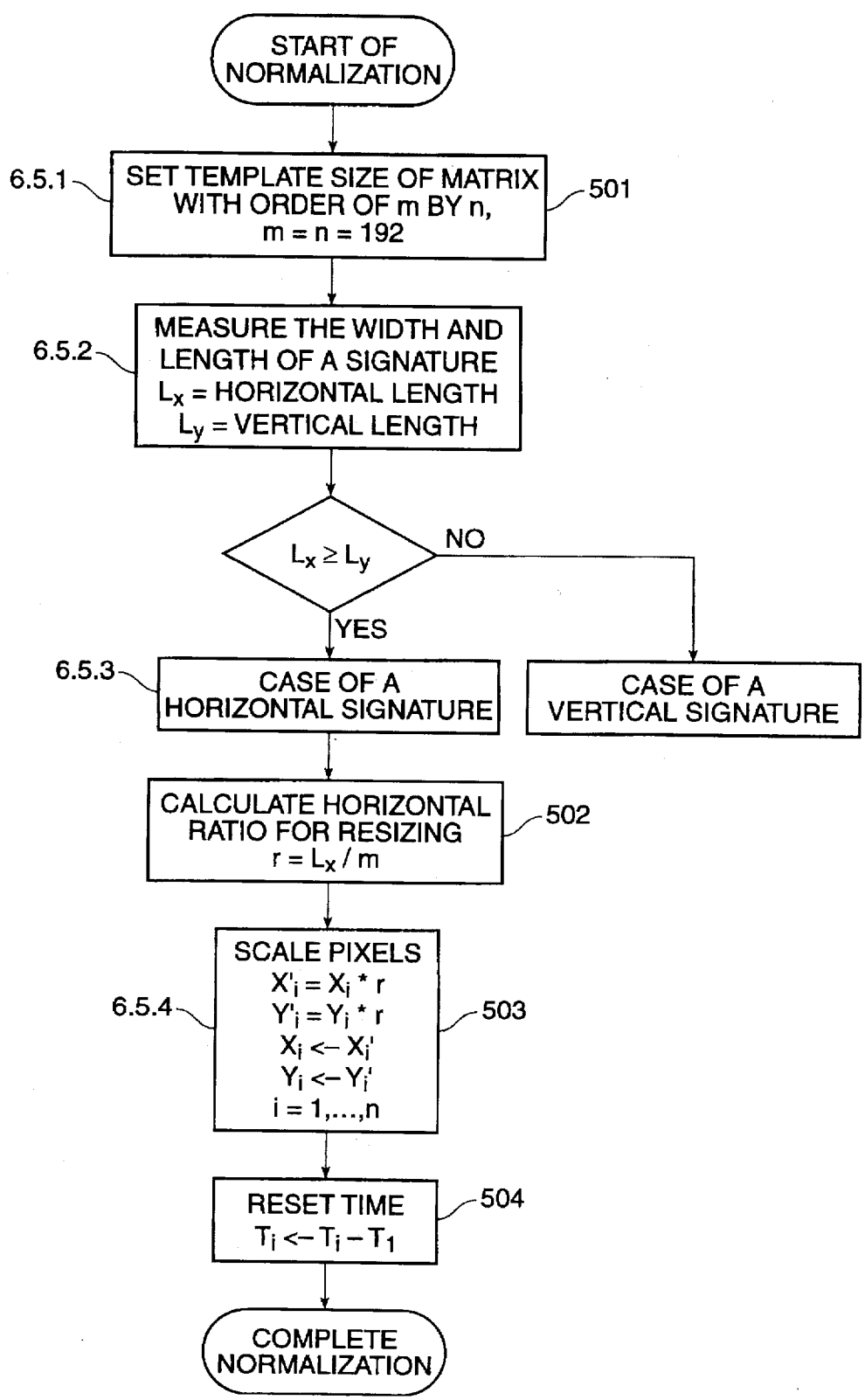
FIG. 5 shows a process flow chart of a method of signature resizing.

FIG. 5 shows a process flow chart of a method of signature resizing.

It may occur that the input signature 103 is written with a varying size. In a preferred embodiment, the input signature 103 is scaled to a uniform size.

At a frame-setting step 501, a frame of size m by n is selected to contain the input signature 103. A preferred value for m may be 192. The orientation of the input signature 103 is determined at the orientation step 401.

At a horizontal-ratio step 502, a ratio r of the actual size of the input signature to the frame size m may be computed, as follows:

$$r = L_x/m$$

At a scaling step 503, each pixel of the input signature 103 may be scaled to a new X coordinate and Y coordinate position, using known geometric formulae.

At a time-reset step 504, each pixel of the input signature 103 may have its time $T_i$ adjusted by subtracting the start time of the input signature 103.

FEATURE EXTRACTION AND TEMPLATE STORAGE

One aspect of the invention is the identification of relatively constant features in signatures, which remain present in the signature of a person even though that person's signature may be rewritten on differing occasions. One valuable indicator of the source of a person's signature is the strength of those features identifiable in that person's template signatures.

One class of features may include time series data, e.g., pen-up/pen-down status, pen position, writing pressure, or writing speed or acceleration, each expressed as a function of time. Another class of features may include parameters derived from the input signature 103, e.g., number of strokes, total time duration or duration of each stroke, number of pixels in each interval (e.g., each interval identified in the partition step 402), centroid of all pixels, higher order moments, minimum and maximum X and Y extent of the signature, or of an interval, peak curvatures and locations thereof, starting location or direction, and other aggregate values known in the art of statistics.

In a preferred embodiment, each identified feature may be expressed as a vector of binary values, each equalling "0" or "1", i.e., a binary vector or bit string. This has the advantage of reducing storage requirements.

Figure 6:
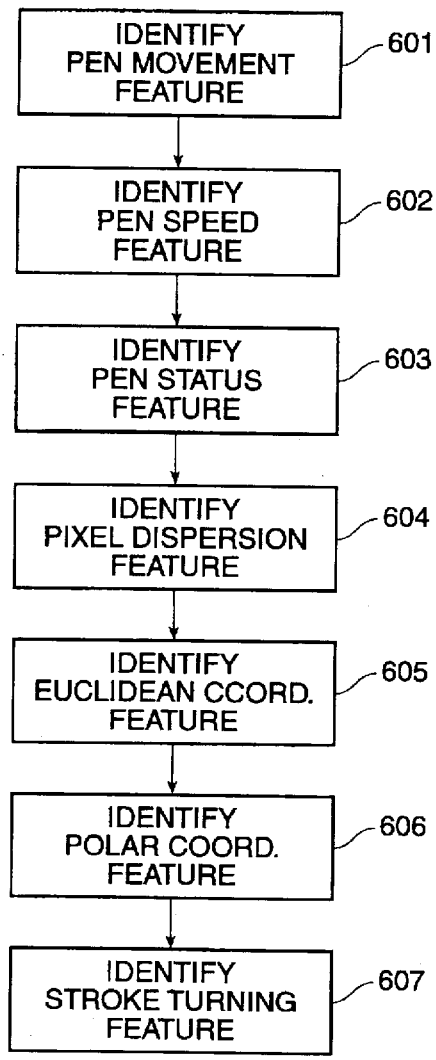
FIG. 6 shows a process flow chart of a method of signature feature extraction.

FIG. 6 shows a process flow chart of a method of signature feature identification and representation.

In a preferred embodiment of the invention, seven specific features of the input signature 103 may be identified. These features may include time series data, such as (1) movement of the writing implement 104 as a function of time, (2) speed of the writing implement 104 as a function of time, (3) pen-up/pen-down status of the writing implement 104 as a function of time, and (4) pixel dispersion as a function of time. These features may also include time-independent features, such as (5) a euclidean coordinate map, (6) a polar coordinate map, and (7) a set of stroke turning positions in a euclidean coordinate map.

At a step 601, a pen movement feature, comprising movement of the writing implement 104 as a function of time, may be identified and represented as a bit vector.

At a step 602, a pen speed feature, comprising speed of the writing implement 104 as a function of time, may be identified and represented as a vector of integers.

At a step 603, a pen status feature, comprising pen-up/pen-down status of the writing implement 104 as a function of time, may be identified and represented as a bit vector.

At a step 604, a pixel dispersion feature, comprising pixel dispersion as a function of time, may be identified and represented as a bit vector.

At a step 605, a euclidean coordinate feature, comprising a euclidean coordinate map of the input signature 103, may be identified and represented as an array of integers.

At a step 606, a polar coordinate feature, comprising a polar coordinate map of the input signature 103, may be identified and represented as a vector of integers.

At a step 607, a stroke turning feature, comprising a set of stroke turning positions in a euclidean coordinate map, may be identified and represented as a bit vector.

Figure 6A:
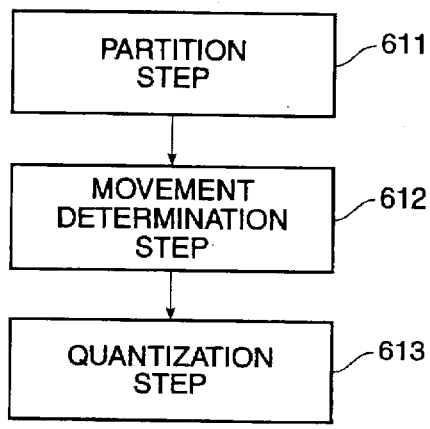
FIG. 6A shows a process flow chart of the step of identifying the pen movement feature.

FIG. 6A shows a process flow chart of the step of identifying the pen movement feature.

At a partition step 611, the input signature 103 may be partitioned into a set of M bins of equal time duration. A preferred value for M may be 32.

At a movement determination step 612, the total movement of the writing implement 104 may be determined. In a preferred embodiment, the sum S of the differences $(X_{i+1} - X_i)$ may be computed for each bin, where both pixels $X_i$ and $X_{i+1}$ belong to the same bin.

At a quantization step 613, the sum is quantized by setting a quantized result R to 1 if the sum S is negative, and by setting a quantized result R to 0 if the sum S is nonnegative.

The feature may be represented by a vector of M bits of the quantized result R.

Figure 6B:
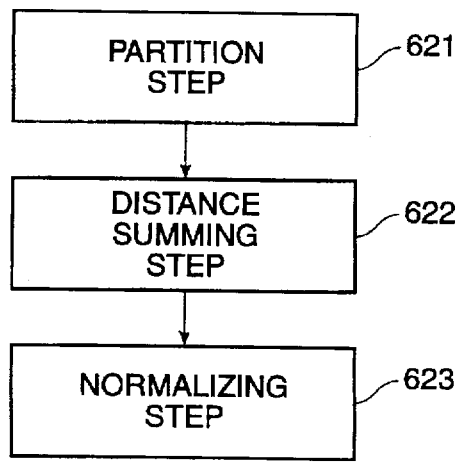
FIG. 6B shows a process flow chart of the step of identifying the pen speed feature.

FIG. 6B shows a process flow chart of the step of identifying the pen speed feature.

At a partition step 621, the input signature 103 may be partitioned into a set of M bins of equal time duration. A preferred value for M may be 32.

At a distance summing step 622, a sum of Euclidean distances of successive pixels in each bin may be determined, e.g., a value for the bin b[i] is set to a sum of square-root $((X_{j+1}-X_j)^2+(Y_{j+1}-Y_j)^2)$, summed over all pixels $<X_j,Y_j>$ in that bin.

At a normalizing step 623, each b[i] may be divided by the total of all b[i].

The feature may be represented by a vector of M integers.

Figure 6C:
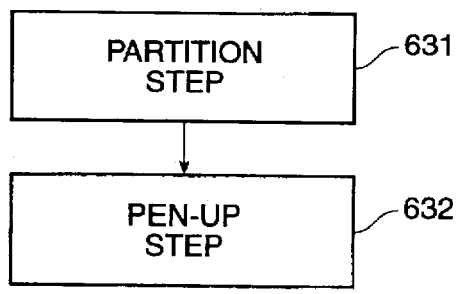
FIG. 6C shows a process flow chart of the step of identifying the pen status feature.

FIG. 6C shows a process flow chart of the step of identifying the pen status feature.

At a partition step 631, the input signature 103 may be partitioned into a set of M bins of equal time duration. A preferred value for M may be 32.

At a pen-up step 632, a status bit b[i] for each bin may be set to "1" if any pixel in that bin has pen-up status. Otherwise, the status bit b[i] for that bin may be set to "0".

The feature may be represented by a vector of M bits.

Figure 6D:
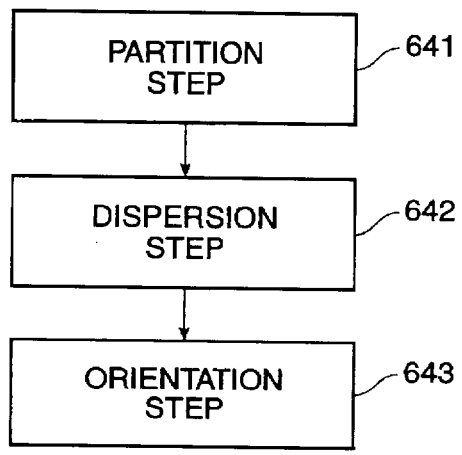
FIG. 6D shows a process flow chart of the step of identifying the pixel dispersion feature.

FIG. 6D shows a process flow chart of the step of identifying the pixel dispersion feature.

At a partition step 641, the input signature 103 may be partitioned into a set of M bins of equal time duration. A preferred value for M may be 32.

At a dispersion step 642, a standard deviation of X coordinates sigma($X_i$) and a standard deviation of Y coordinates sigma ($Y_i$) may be determined, using known statistical formulae.

At an orientation step 643, a pixel dispersion bit b[i] for each bin may be set to "0" if sigma($X_i$)>sigma($Y_i$) and the signature is horizontal, and may be set to "1" if sigma($X_i$) <sigma($Y_i$) and the signature is determined to be horizontal. If the signature is determined to be vertical, these "0" and "1" bit values may be inverted.

The feature may be represented by a vector of M bits.

Figure 6E:
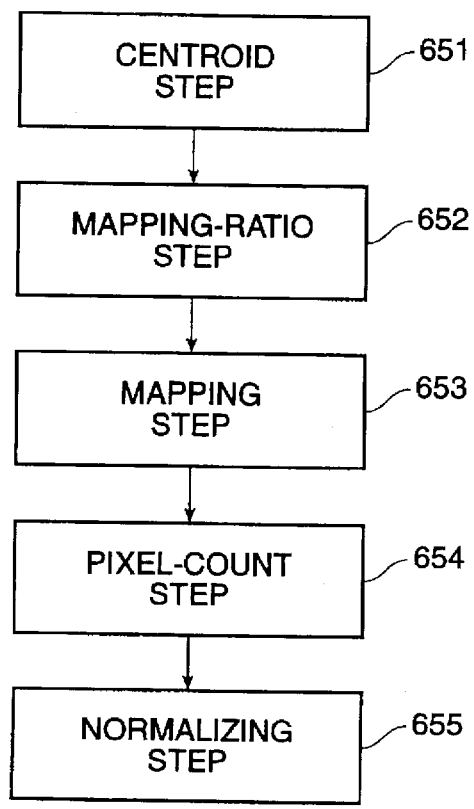
FIG. 6E shows a process flow chart of the step of identifying the euclidean coordinate feature.

FIG. 6E shows a process flow chart of the step of identifying the euclidean coordinate feature.

For this feature, the input signature 103 may be mapped onto an M×N matrix of bins b[x,y]. A preferred value for M may be 16; a preferred value for N may be 16.

At a centroid step 651, a coordinate $<X_{mean},Y_{mean}>$ may be mapped onto bin b[M/2,N/2].

At a mapping-ratio step 652, a farthest coordinate from the center $X_f$ for horizontal signatures ($Y_f$ for vertical signatures) may be determined. A ratio r for mapping pixels may be determined:

$$r = \left| \frac{X_f - X_{mean}}{M/2} \right|$$

At a mapping step 653, each pixel $<X_k,Y_k>$ may be mapped onto a bin b[i,j], where $$i = \left| \frac{X_k - X_{mean}}{r} \right|$$

$$j = \left| \frac{Y_k - Y_{mean}}{r} \right|$$

At a pixel-count step 654, the number of pixels mapped onto each bin b[i,j] may be counted.

At a normalizing step 655, the number of pixels for each bin b[i,j] may be divided by the total number of pixels in the signature. In a preferred embodiment, the normalized value may be rounded up to the nearest integer if it comprises a fractional value.

The feature may be represented by an M×N array of integers. In a preferred embodiment, each integer may be represented by six bits in unsigned binary format, with values greater than 63 represented by the bit string for 63, i.e., "111111". When retrieved for Levenshtein distance comparison, the binary data may be unpacked into the M×N array of integers.

Figure 6G:
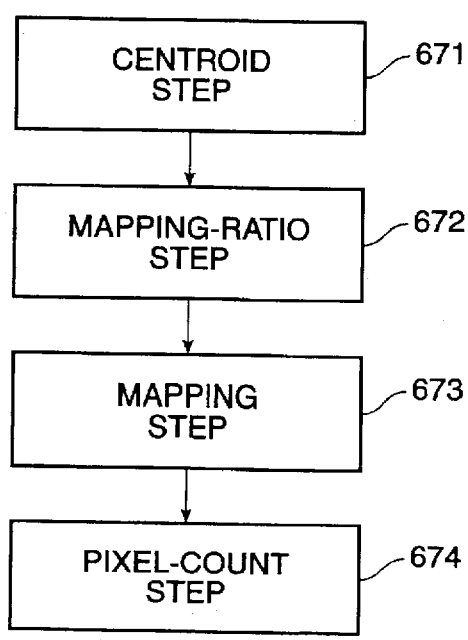
FIG. 6G shows a process flow chart of the step of identifying the stroke turning feature.
Figure 6F:
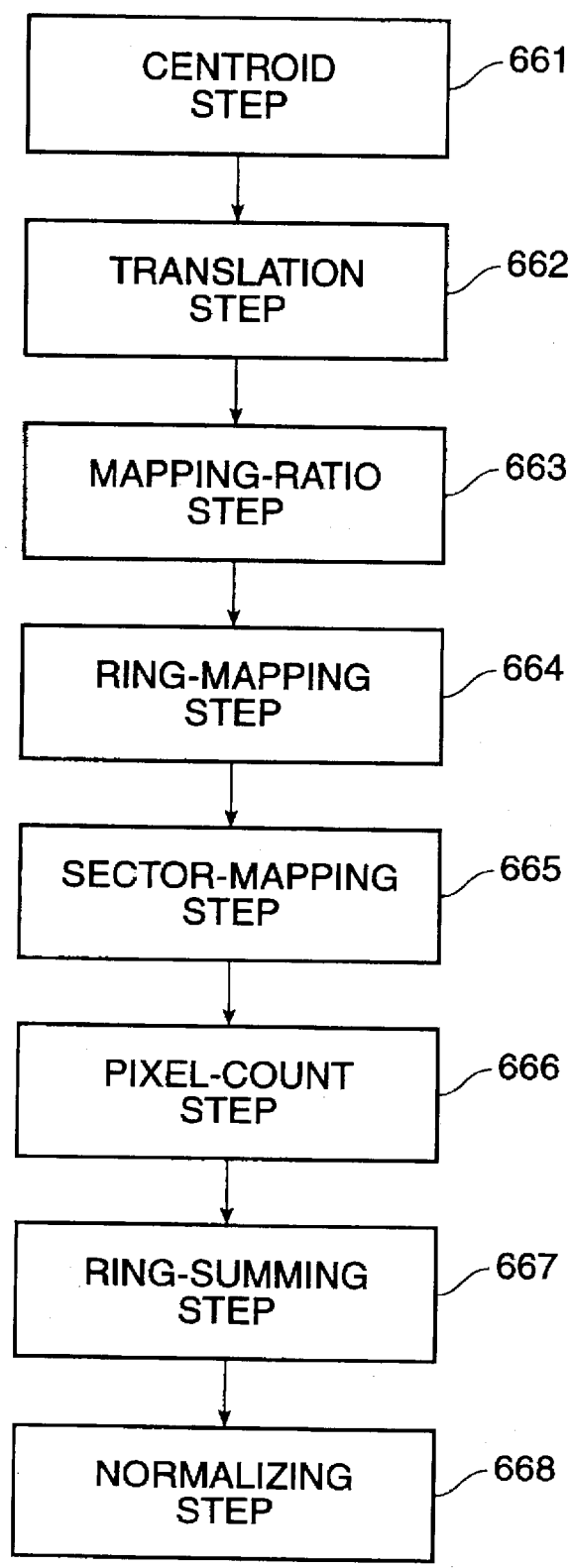
FIG. 6F shows a process flow chart of the step of identifying the polar coordinate feature.

FIG. 6F shows a process flow chart of the step of identifying the polar coordinate feature.

For this feature, the input signature 103 may be mapped onto a polar coordinate structure with M equidistant concentric rings and N equiangular sectors in each ring. A preferred value for M may be 24; a preferred value for N may be 24.

At a centroid step 661, a coordinate $<X_{mean},Y_{mean}>$ may be mapped onto the origin of the polar coordinate system.

At a translation step 662, each pixel $<X_k,Y_k>$ may be translated by subtraction of $<X_{mean},Y_{mean}>$.

At a mapping-ratio step 663, a farthest radius from the center $R_f$ may be determined. A ratio r for mapping pixels may be determined:

$$r = \left| \frac{R_f}{M} \right|$$

At a ring-mapping step 664, each pixel $<X_k,Y_k>$ may be mapped onto a ring, where $$ring = \frac{\text{square-root}(X_k^2 + Y_k^2)}{r}$$

At a sector-mapping step 665, each pixel $<X_k,Y_k>$ may be mapped onto a sector within its ring, where
theta=arctan $(Y_k/X_k)$, $+2\pi$ if needed to bring within $(0,2\pi)$
sector=theta*(180/$\pi$)/(360/N)

At a pixel-count step 666, the number of pixels mapped onto each <ring,sector> tuple may be counted.

At a ring-summing step 667, the number of pixels for each ring may be summed, i.e., the number of pixels for all the sectors in each ring are summed and placed in M bins b[i].

At a normalizing step 668, the number of pixels for each bin b[i] may be divided by the total number of pixels in the signature. In a preferred embodiment, the normalized value may be rounded up to the nearest integer if it comprises a fractional value.

The feature may be represented by an M×N array of integers for bins b[ring,sector]; the value for the origin of the polar coordinate may be discarded for this feature. In a preferred embodiment, each integer may be represented by six bits in unsigned binary format, with values greater than 63 represented by the bit string for 63, i.e., "111111". When retrieved for Levenshtein distance comparison, the binary data may be unpacked into the M×N array of integers.

FIG. 6G shows a process flow chart of the step of identifying the stroke turning feature.

For this feature, the input signature 103 may be mapped onto an M×N matrix of bins b[x,y]. A preferred value for M may be 16; a preferred value for M may be 16.

A centroid step 671 and a mapping-ratio step 672 may be performed in like manner as the centroid step 651 and mapping-ratio step 652.

At a mapping step 673, each pixel $<X_k,Y_k>$ which may comprise a stroke-turning point may be mapped onto a bin b[i,j], in like manner as pixels are mapped onto a bin b[i,j] in the mapping step 653. As used herein, a stroke-turning point is a point where there is a change in stroke direction.

In a preferred embodiment, stroke-turning points may be recognized by examining each set of five consecutive pixels for a change of direction as the middle point. A change of direction may be recognized in a variety of ways, e.g., by determining if the middle point is a minimum, maximum, or inflection point using known methods of elementary calculus, applied to discrete points.

A pixel-count step 674 and a normalizing step 675 may be performed in like manner as the pixel-count step 654 and the normalizing step 655.

The feature may be represented by an M×N array of integers. In a preferred embodiment, each integer may be represented by six bits in unsigned binary format, with values greater than 63 represented by the bit string for 63, i.e., "111111". When retrieved for Levenshtein distance comparison, the binary data may be unpacked into the M×N array of integers.

FEATURE RETRIEVAL AND SIGNATURE COMPARISON

Once a feature has been identified and represented as a template feature bit string, a weight matrix may be generated according to the discrete Hopfield asynchronous network paradigm. The discrete Hopfield asynchronous network is known in the art and so is not disclosed in detail here. A more complete discussion may be found in "Neural Networks and Physical Systems with Emergent Collective Computational Abilities", by John J. Hopfield, published 1982 in "Proceedings of the National Academy of Sciences, U.S.A. 1979", pages 2554–2558, hereby incorporated by reference as if fully set forth herein.

Figure 7:
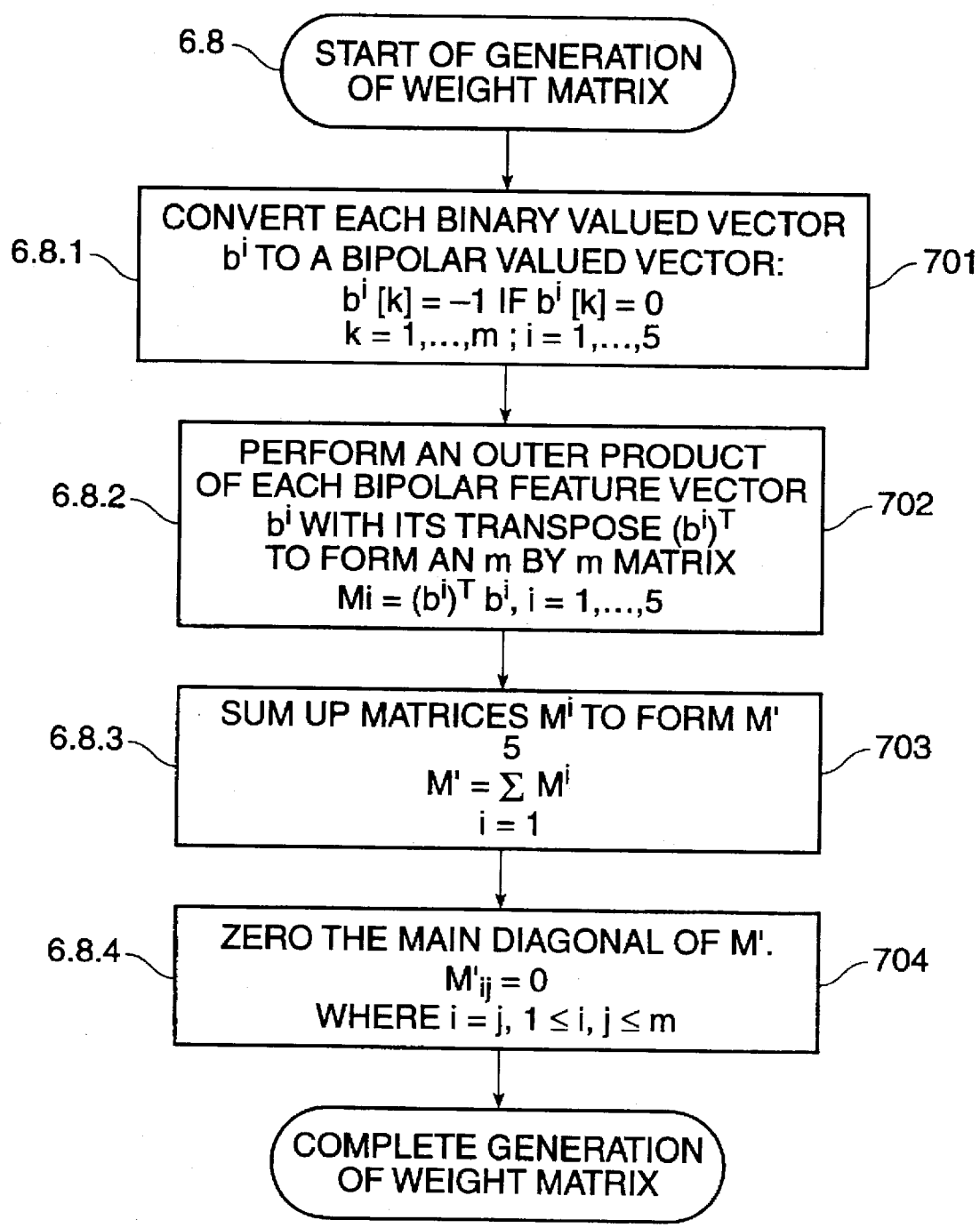
FIG. 7 shows a process flow chart of a method of signature feature storage (generation of a Hopfield weight matrix).

FIG. 7 shows a process flow chart of a method of signature feature storage (generation of a Hopfield weight matrix).

At a bipolar-conversion step 701, each binary value (0 or 1) may be converted to a bipolar value (−1 or +1), by replacing all "0" values with −1 values.

At an outer-product step 702, an outer product may be computed for each binary vector with its transpose. Where the binary vector is length m, the product M will be an m×m bipolar matrix.

At a summation step 703, the outer products for the selected feature of all (five) of the template signatures are added to generate a summed matrix M'.

At a zero-diagonal step 704, the main diagonal of the summed matrix M' is set to zero. The resulting matrix M' is herein called a weight matrix or a memory matrix.

Once a feature in the test input signature 103 has been identified and represented as a test feature bit string, differences between the test feature bit string and the template feature bit strings may be determined according to the asynchronous update paradigm of the discrete Hopfield network. String distance may be computed according to the Levenshtein distance. The Levenshtein distance is known in the art and so is not disclosed in detail here. A more complete discussion may be found in "Binary Codes Capable of Correcting Deletions, Insertions, and Reversals", by V. J. Levenshtein, published 1965 in "Doklady Akademii Nauk SSR" 163(4), pages 845–848, hereby incorporated by reference as if fully set forth herein.

Figure 8A:
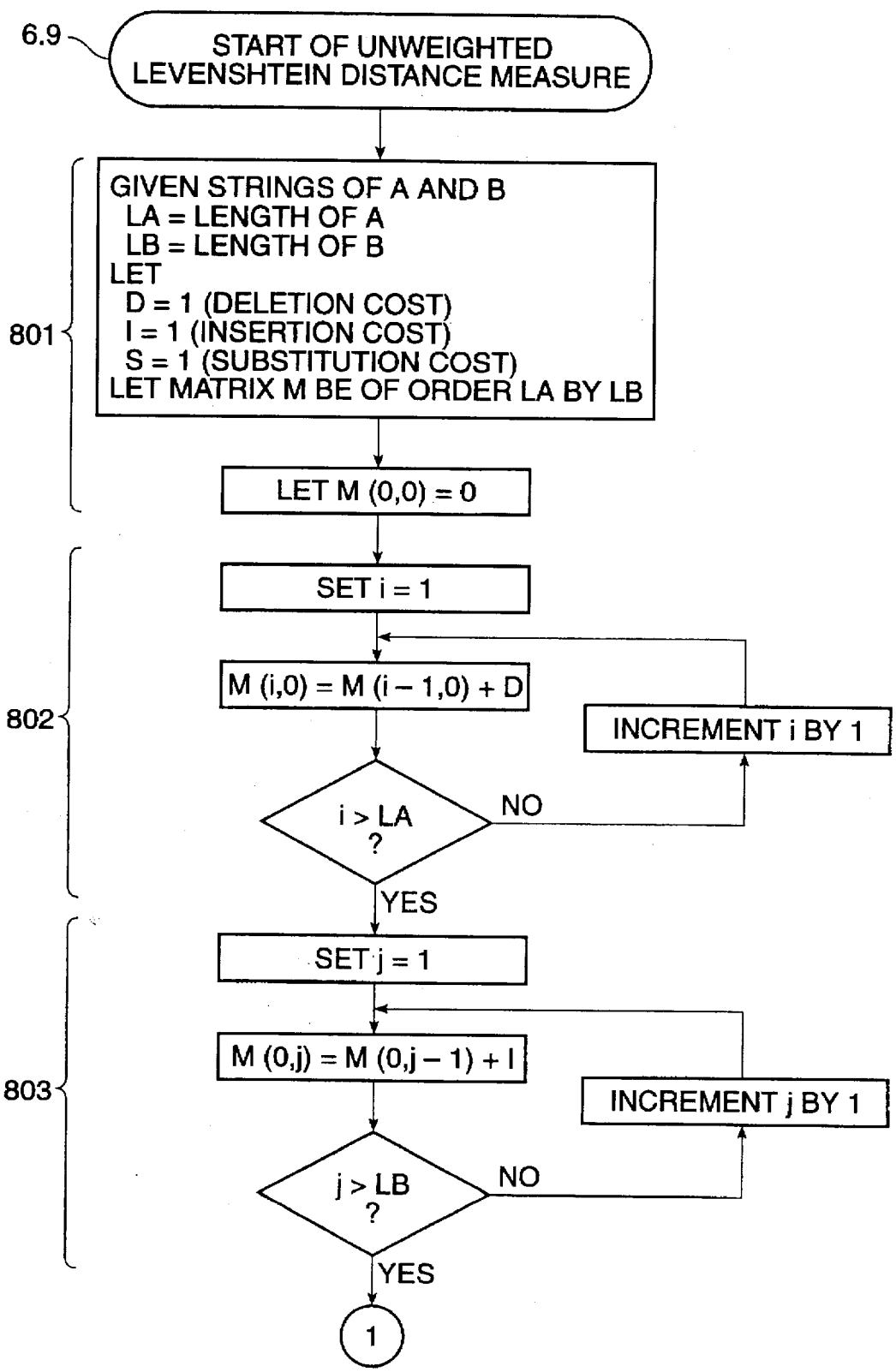
FIGS. 8A and 8B show a process flow chart of a method of unweighted Levenshtein distance measure.
Figure 8B:
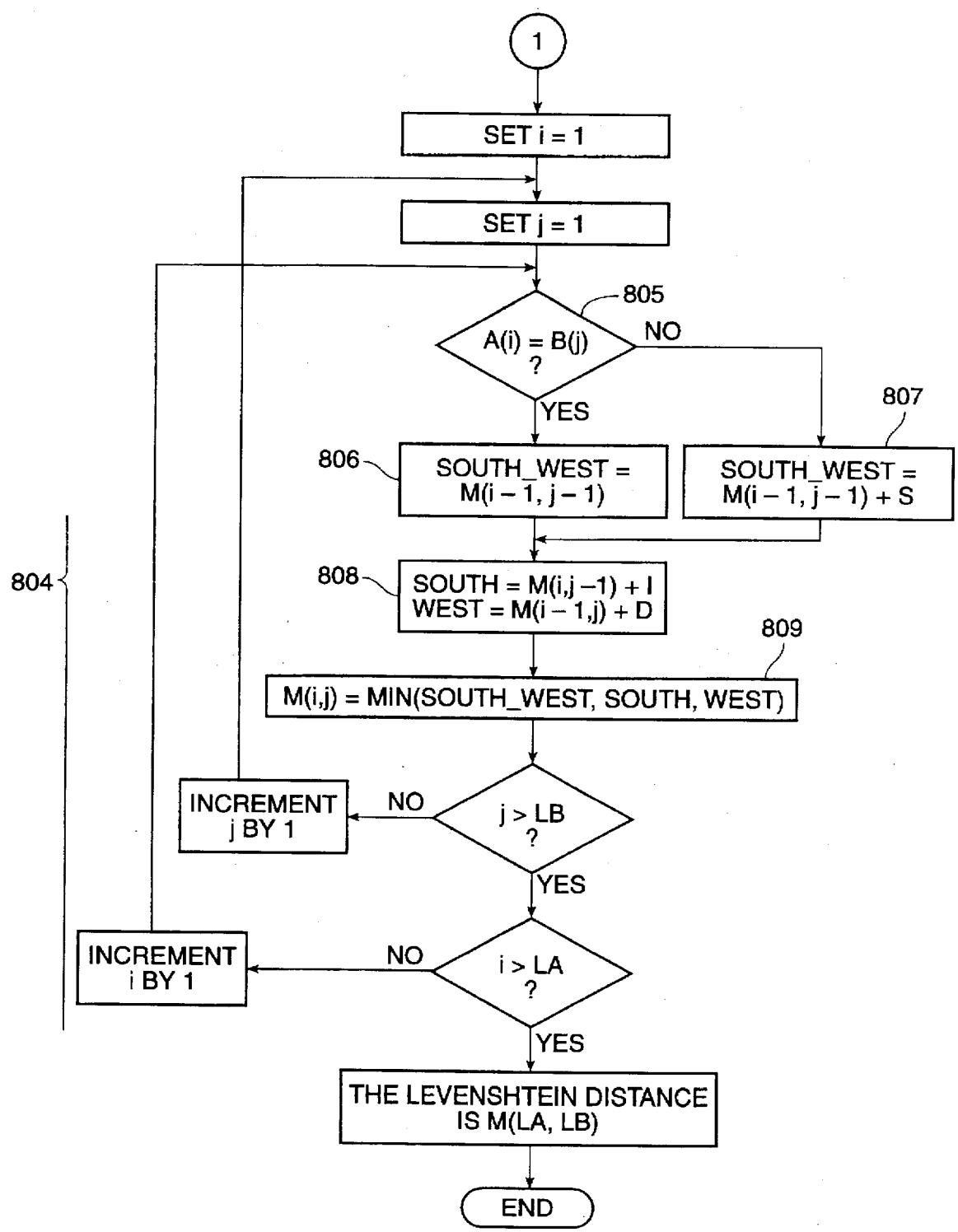

FIGS. 8A and 8B show a process flow chart of a method of unweighted Levenshtein distance measure.

Briefly, the Levenshtein distance between two strings of symbols may be computed by determining how many symbols must be added, how many deleted, and how many substituted, from a first string A to a second string B.

At an initialization step 801, the length $L_a$ of string A, the length $L_b$ of string B, the deletion cost D, the insertion cost I, and the substitution cost S may be determined. A preferred value for D may be 1, a preferred value for I may be 1, and a preferred value for S may be 1. A distance matrix M may be allocated with an initial value for M(0,0) of zero.

In a deletion-loop 802, the value for M(i,0) may be set to M(i−1,0)+D, for each value of i<$L_a$. The variable i may be a counter.

In an insertion-loop 803, the value for M(0,j) may be set to M(0,j−1)+I, for each value of j<$L_b$. The variable j may be a counter.

In a substitution-loop 804, the counter variables i and j may be allowed to range over each value i≤$L_a$ and j≤$L_b$. At step 805, the ith position of string A may be compared with the jth position of string B. For each location in M, the value for M(i,j) may be set to M(i−1,j−1) (at step 806), plus S if the values of the strings differ in their ith and jth positions (at step 807). At step 808, the value for M(i,j) may be computed for achieving the substitution by deletion or insertion instead. At step 809, the value for M(i,j) may be set to a lower value if one could be achieved by deletion or insertion instead.

Figure 9:
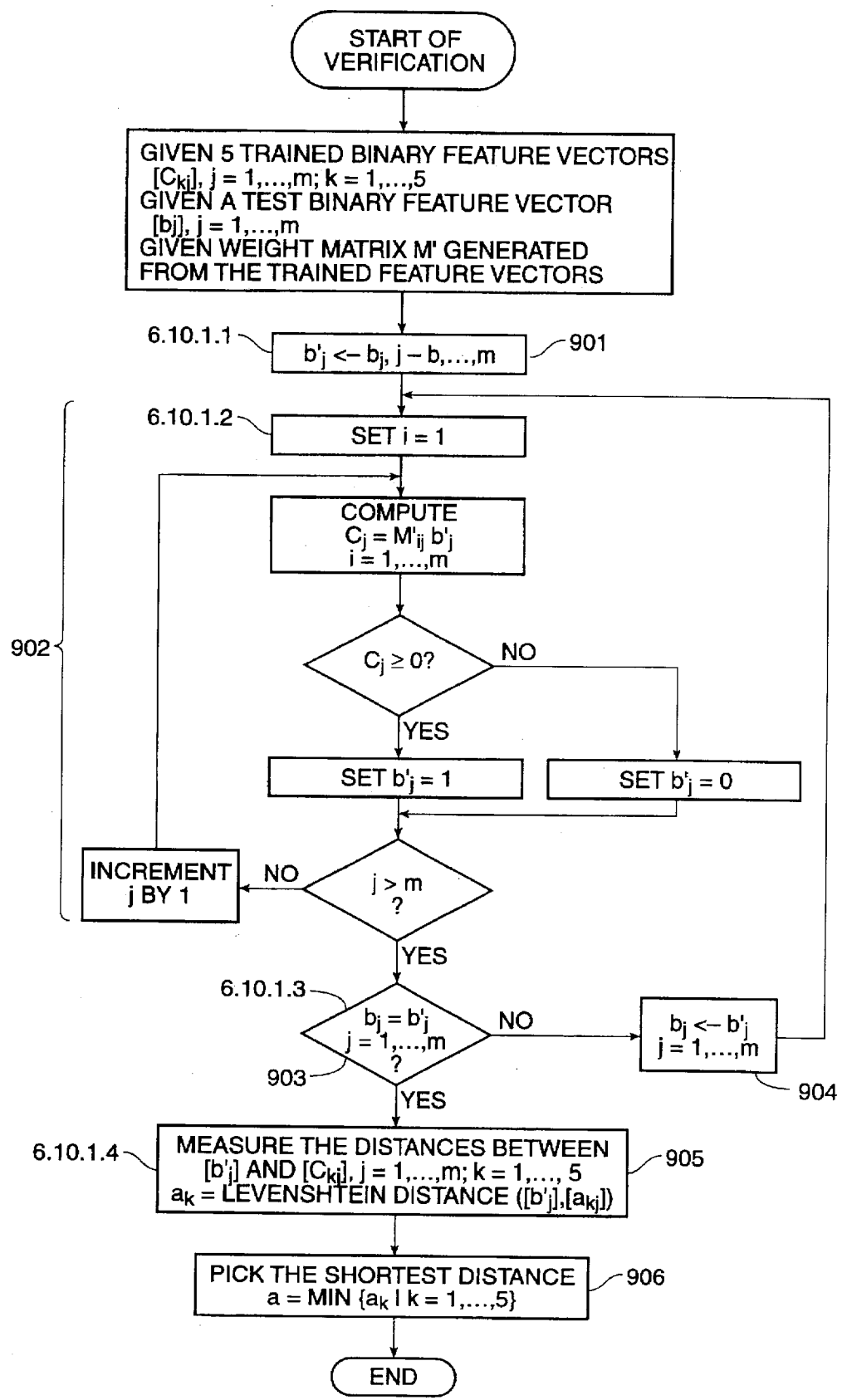
FIG. 9 shows a process flow chart of a method of signature comparison with template signatures.

FIGS. 9A and 9B show a process flow chart of a method of signature comparison with template signatures.

At an initialization-step 901, the weight matrix M' and a feature bit string b are known. An altered feature bit string b' may be set equal to b.

In an update-loop 902, a vector c may be computed as the product M'×b'. Each bit of b' may be altered to equal "1" if that element of c is $\geq 0$, and otherwise may be altered to equal "0".

At a loop-complete step 903, the updated bit string b' may be compared with the original bit string b. If they are different, the updated bit string b' may be assigned to the original bit string b at step 904 and the update-loop 902 may be re-entered. Otherwise, the update-loop 902 is complete and the method may continue with step 905.

At a measurement step 905, the Levenshtein distance of the updated bit string b' from the template feature bit strings may be computed.

At a minimum-distance step 906, the minimum Levenshtein distance computed may be determined to be the distance of the test feature bit string from the template feature bit strings.

In a preferred embodiment, the pen movement feature data may comprise 32 bits, and may be packed into 4 bytes at 8 bits per byte. The pen speed feature data may comprise 32 integers, encoded with six bits per integer, thus 192 bits, and may be packed into 24 bytes at 8 bits per byte. The pen status feature data may comprise 32 bits, and may be packed into 4 bytes at 8 bits per byte. The pixel dispersion feature data may comprise 32 bits, and may be packed into 4 bytes at 8 bits per byte. The euclidean coordinate feature data may comprise 16×16=256 integers, encoded with six bits per integer, thus 1536 bits, and may be packed into 192 bytes at 8 bits per byte. The polar coordinate feature data may comprise 24 integers, encoded with six bits per integer, thus 144 bits, and may be packed into 18 bytes at 8 bits per byte. The stroke turning feature data may comprise 16×16=256 bits, and may be packed into 32 bytes at 8 bits per byte.

In a preferred embodiment, a packed data structure for feature data may be expressed as follows in the C programming language:

```
typedef struct
    {
    char movement[5];
    char speed[25];
    char status[5];
    char dispersion[5];
    char euclidean_map[193];
    char polar_map[19];
    char turning_position[33]
    } PACKED_FEATURE
```

In a preferred embodiment, a packed data structure of five template signatures may be expressed as follows in the C programming language:

PACKED_FEATURE packed_template_feature[5];

In a preferred embodiment, this data structure may be stored in a database of signatures.

In a preferred embodiment, an unpacked data structure for feature data may be expressed as follows in the C programming language:

```
typedef struct
    {
    char movement[33];
    short speed[32];
    char status[33];
    char dispersion[33];
    short euclidean_map[256];
    short polar_map[24];
    char turning_position[257]
    } UNPACKED_FEATURE
```

In a preferred embodiment, an unpacked data structure of five template signatures may be expressed as follows in the C programming language:

UNPACKED_FEATURE unpacked_template_feature[5];

In a preferred embodiment, this data structure may be used for storing features which are determined for template signatures and unpacked from a database of signatures.

An example Levenshtein distance comparison is shown in the following table for two 20-bit bitstrings:

Let a test feature vector of 20 bits be defined as follows: "11000 10110 11101 10101"

Let a template feature vector of 20 bits be defined as follows: "01101 01011 01110 11010"

| 0  | 1  | 2  | 3  | 4  | 5  | 6  | 7  | 8  | 9  | 10 | 11 | 12 | 13 | 14 | 15 | 16 | 17 | 18 | 19 | 20 |
|----|----|----|----|----|----|----|----|----|----|----|----|----|----|----|----|----|----|----|----|----|
| 1  | 1  | 1  | 2  | 3  | 4  | 5  | 6  | 7  | 8  | 9  | 10 | 11 | 12 | 13 | 14 | 15 | 16 | 17 | 18 | 19 |
| 2  | 2  | 1  | 1  | 2  | 3  | 4  | 5  | 6  | 7  | 8  | 9  | 10 | 11 | 12 | 13 | 14 | 15 | 16 | 17 | 18 |
| 3  | 2  | 2  | 2  | 1  | 2  | 3  | 4  | 5  | 6  | 7  | 8  | 9  | 10 | 11 | 12 | 13 | 14 | 15 | 16 | 17 |
| 4  | 3  | 3  | 3  | 2  | 2  | 2  | 3  | 4  | 5  | 6  | 7  | 8  | 9  | 10 | 11 | 12 | 13 | 14 | 15 | 16 |
| 5  | 4  | 4  | 4  | 3  | 3  | 2  | 3  | 3  | 4  | 5  | 6  | 7  | 8  | 9  | 10 | 11 | 12 | 13 | 14 | 15 |
| 6  | 5  | 4  | 4  | 4  | 3  | 3  | 2  | 3  | 3  | 4  | 5  | 6  | 7  | 8  | 9  | 10 | 11 | 12 | 13 | 14 |
| 7  | 6  | 5  | 5  | 4  | 4  | 3  | 3  | 2  | 3  | 4  | 4  | 5  | 6  | 7  | 8  | 9  | 10 | 11 | 12 | 13 |
| 8  | 7  | 6  | 5  | 5  | 4  | 4  | 3  | 3  | 2  | 3  | 4  | 4  | 5  | 6  | 7  | 8  | 9  | 10 | 11 | 12 |
| 9  | 8  | 7  | 6  | 6  | 5  | 5  | 4  | 4  | 3  | 2  | 3  | 4  | 4  | 5  | 6  | 7  | 8  | 9  | 10 | 11 |
| 10 | 9  | 8  | 7  | 6  | 6  | 5  | 5  | 4  | 4  | 3  | 2  | 3  | 4  | 5  | 5  | 6  | 7  | 8  | 9  | 10 |
| 11 | 10 | 9  | 8  | 7  | 6  | 6  | 5  | 5  | 4  | 4  | 3  | 2  | 3  | 4  | 5  | 5  | 6  | 7  | 8  | 9  |
| 12 | 11 | 10 | 9  | 8  | 7  | 7  | 6  | 6  | 5  | 4  | 4  | 3  | 2  | 3  | 4  | 5  | 5  | 6  | 7  | 8  |
| 13 | 12 | 11 | 10 | 9  | 8  | 8  | 7  | 7  | 6  | 5  | 5  | 4  | 3  | 2  | 3  | 4  | 5  | 6  | 6  | 7  |
| 14 | 13 | 12 | 11 | 10 | 9  | 8  | 8  | 7  | 7  | 6  | 5  | 5  | 4  | 3  | 2  | 3  | 4  | 5  | 6  | 6  |
| 15 | 14 | 13 | 12 | 11 | 10 | 9  | 8  | 8  | 7  | 7  | 6  | 5  | 5  | 4  | 3  | 2  | 3  | 4  | 5  | 6  |
| 16 | 15 | 14 | 13 | 12 | 11 | 10 | 9  | 9  | 8  | 7  | 7  | 6  | 5  | 5  | 4  | 3  | 2  | 3  | 4  | 5  |
| 17 | 16 | 15 | 14 | 13 | 12 | 11 | 10 | 9  | 9  | 8  | 7  | 7  | 6  | 6  | 5  | 4  | 3  | 2  | 3  | 4  |

| 18 | 17 | 16 | 15 | 14 | 13 | 12 | 11 | 10 | 9  | 9  | 8  | 7 | 7 | 6 | 6 | 5 | 4 | 3 | 2 | 3 |
|----|----|----|----|----|----|----|----|----|----|----|----|---|---|---|---|---|---|---|---|---|
| 19 | 18 | 17 | 16 | 15 | 14 | 13 | 12 | 11 | 10 | 10 | 9  | 8 | 7 | 6 | 6 | 5 | 4 | 3 | 2 |   |
| 20 | 19 | 18 | 17 | 16 | 15 | 14 | 13 | 12 | 11 | 10 | 10 | 9 | 8 | 8 | 7 | 6 | 6 | 5 | 4 | 3 |

The Levenshtein distance between the two feature vectors is the last element, i.e., the lower right corner element, which is 3.

Figure 10:
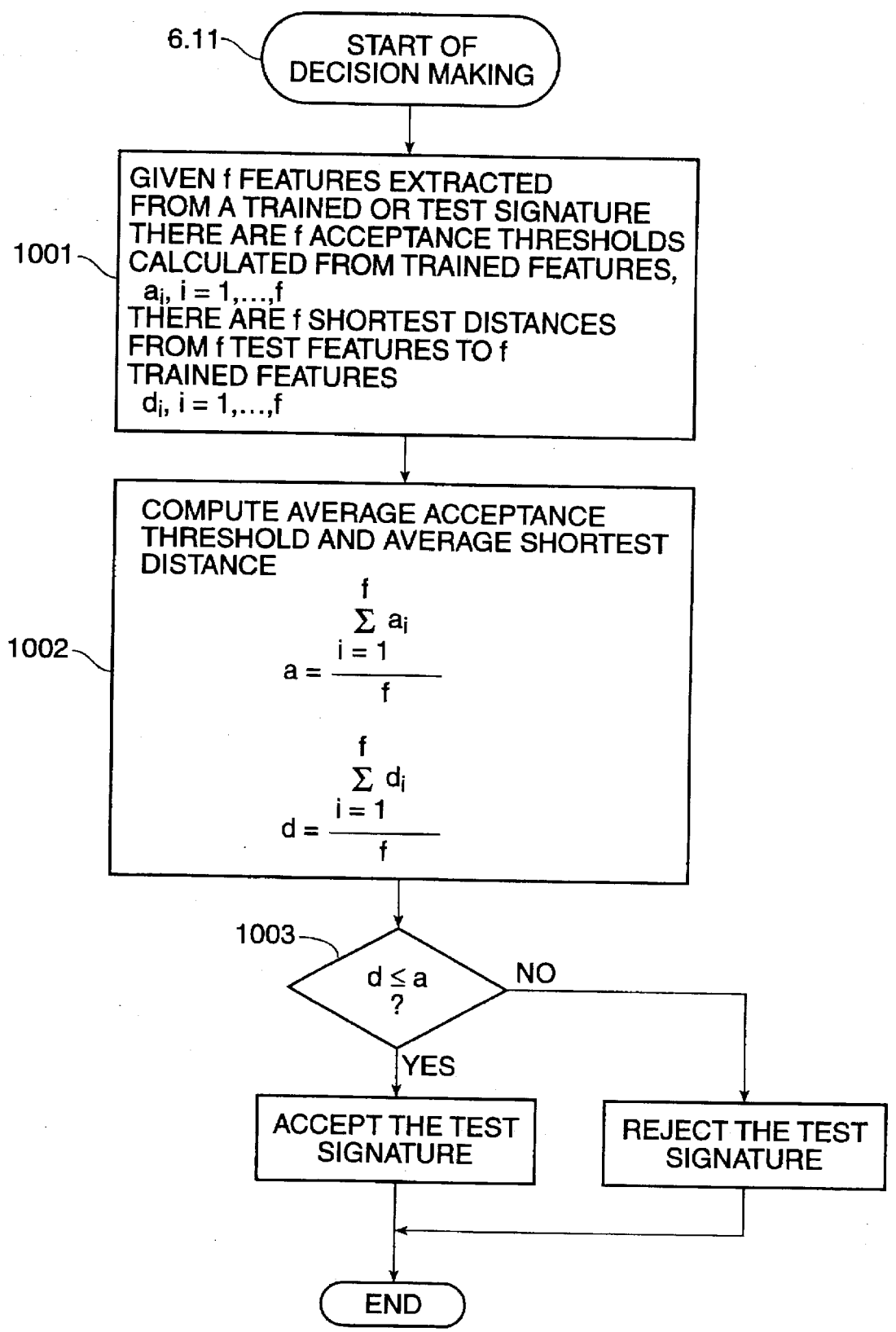
FIG. 10 shows a process flow chart of a method of signature accept/reject decision.

FIG. 10 shows a process flow chart of a method of signature accept/reject decision.

At a threshold step 1001, an acceptance threshold for each feature is determined.

In a preferred embodiment, the acceptance threshold may be determined in response to the distances between pairs of the template input signatures 103. In a preferred embodiment with five template input signatures 103, there will be ten such pairwise distances, as shown in the following table:

|   | 1  | 2  | 3  | 4   | 5   |
|---|----|----|----|-----|-----|
| 1 | 0  | d1 | d2 | d3  | d4  |
| 2 | d1 | 0  | d5 | d6  | d7  |
| 3 | d2 | d5 | 0  | d8  | d9  |
| 4 | d3 | d6 | d8 | 0   | d10 |
| 5 | d4 | d7 | d9 | d10 | 0   |

In a preferred embodiment, these ten pairwise distances may be arranged in decreasing order, and the kth distance may be selected as an acceptance threshold. A preferred value for k may be 7, i.e., the 7th greatest distance may be selected as an acceptance threshold. The greater k is, the tighter the acceptance threshold; i.e., when k is 9, the 9th greatest distance may be selected as an acceptance threshold.

At an averaging step 1002, an average acceptance threshold a and an average distance d may be computed.

At a comparison step 1003, the average acceptance threshold a and an average distance d may be compared. If the average acceptance threshold a is less than the average distance d, the test input signature 103 may be accepted and the verification signal 108 may be generated. Otherwise, the test input signature 103 may be rejected and the verification signal 108 may be absent.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A method of handwritten signature verification, comprising the steps of receiving a plurality of handwritten template signature;

defining a template feature vector for each of said template signatures;

performing a vector comparison between each pair of said template feature vectors so as to determine a plurality of template-template distances;

selecting one of said template-template distances other than a minimum or a maximum;

constructing a bit vector in response to each template feature vector and training a neural network in response to said bit vectors;

receiving a handwritten test signature;

defining a test feature vector in response to said test signature;

inputting said test feature vector to said neural network and generating a derived feature vector, different from said test feature vector, in response thereto;

performing a vector comparison between said derived feature vector and each one of said template feature vectors so as to determine a plurality of test-template distances;

determining a minimum one of said plurality of test-template distances; and verifying said test handwritten signature if said minimum one of said test-template distances is less than or equal to said selected one of said template-template distances.

2. A method as in claim 1, comprising the steps of associating a set of authorization privileges with at least one said template signature;

associating said test signature with at least one said template signature, responsive to said step of verifying; and authorizing a person associated with said test signature responsive to said step of verifying and responsive to said authorization privileges.

3. A method as in claim 1, comprising the steps of transforming each one of said template signatures into a first data structure representative of movements of a writing instrument for said template signature;

identifying a relative rotation of each one of said template signatures; and altering each one of said first data structures responsive to said step of identifying.

4. A method as in claim 1, comprising the steps of transforming said test signature into a second data structure representative of movements of a writing instrument for said test signature;

identifying a relative rotation of said test signature; and altering said second data structure responsive to said step of identifying.

5. A method as in claim 1, comprising the steps of transforming each one of said template signatures into a first data structure representative of movements of a writing instrument for said template signature;

dividing said first data structure into a plurality of segments;

computing a measure of dispersion for each said segment;

defining, for a first said segment, a set of retained pixels less than all pixels in said first segment, responsive to said measure of dispersion for said first segment;

computing a regression line responsive to said retained pixels; and rotating said template signature responsive to said regression line.

6. A method as in claim 1, wherein each one of said template signatures comprises a plurality of pixels, each said pixel having spatial information associated therewith;

said method comprising the steps of determining a measure of physical size for written representations of each one of said template signatures; and altering said spatial information for each said pixel so that said measure is substantially equal for each one of said template signatures.

7. A method as in claim 1,
wherein each one of said template signatures comprises a plurality of pixels, each said pixel having spatial information associated therewith;
said method comprising the steps of
for a first pixel of said plurality, defining a neighborhood for said first pixel;
altering said spatial information associated with said first pixel, responsive to said spatial information associated with at least one pixel in said neighborhood;
computing a distance measure for said first pixel, responsive to at least one pixel in said neighborhood; and
repeating said steps of defining and altering, responsive to said distance measure.

8. A method as in claim 1, wherein each one of said template signatures comprises a plurality of pixels, each said pixel having spatial information associated therewith, and wherein said step of defining a template feature vector for each of said template signatures comprises the steps of
dividing each one of said template signatures into a plurality of segments;
computing a summary measure for each said segment, responsive to a set of pixels in said segment;
quantizing said summary measure for each said segment to generate a quantized measure, wherein said quantized measure comprises fewer than nine bits; and
constructing a bit vector comprising said quantized measures.

9. A method as in claim 8, wherein said writing information is in the set composed of
a set of positions, at known time intervals, of a writing implement used to generate said first set of signatures;
a set of speeds, at known time intervals, of said writing implement;
a set of pen-up/pen-down status bits, at known time intervals, of said writing implement;
a set of measures of pixel dispersion, at known time intervals, of said first set of signatures;
a euclidean coordinate map of at least one of said first set of signatures;
a polar coordinate map of at least one of said first set of signatures; and
a set of stroke turning positions in a euclidean coordinate map of at least one of said first set of signatures.

10. A method as in claim 1, wherein said step of selecting one of said template-template distances comprises the steps of
sorting said template-template distances by magnitude to generate an ordered list; and
selecting one of said template-template distances in said ordered list responsive to a position on said ordered list.

11. A method as in claim 1, wherein said template feature vector for each said template signature comprises a binary vector having less than 2400 bits of information.

12. A method as in claim 1, wherein said step of selecting one of said inter-template distances comprises the steps of
ranking said template-template distances; and
selecting a one of said template-template distances having a rank other than a minimum or maximum.

13. A method for determining whether a first person is a particular individual, said method comprising the steps of storing a plurality of template features for each of a plurality of template signatures of the particular individual, each of said template features representing a selected characteristic of one of said template signatures;
performing a comparison between each pair of said sets of template features so as to determine a plurality of template-template distances;
selecting one of said template-template distances other than a minimum or a maximum;
training a neural network in response to said sets of template features;
providing a plurality of test features for a test signature made on a signature transducer by said first person, each of said test features representing a selected characteristic of said test signature;
inputting said set of test features to said neural network and generating a set of derived features, different from said set of test features, in response thereto;
performing a vector comparison between said derived feature vector and each one of said template feature vectors so as to determine a plurality of test-template distances;
selecting one of said plurality of test-template distances; and
generating a signal indicating a match if said selected one of said test-template distances is less than or equal to said selected one of said template-template distances.

14. A method as in claim 13, wherein said selected one of said plurality of test-template distances is a minimum one of said plurality of test-template distances.

15. Apparatus for handwritten signature verification, comprising
a pen tablet;
a processor coupled to said pen tablet and disposed for receiving a plurality of template signatures and a test signature;
said processor comprising means for defining a template descriptor for each said template signatures and a test descriptor for said test signature;
said processor being disposed for comparing each pair of said template descriptors, generating a plurality of template-template distances in response thereto, and selecting one of said plurality of template-template distances other than a maximum;
an associative memory, said associative memory disposed for storing each of said template descriptors, for being addressed using said test descriptor, and for retrieving a derived descriptor in response to said template descriptors and said test descriptor;
said processor comprising means for comparing said derived descriptor against each said template descriptor, generating a plurality of test-template distances in response thereto, selecting one of said plurality of test-template distances, and comparing said one of said plurality of test-template distances against said one of said plurality of template-template distances; and
means for displaying an output of said processor responsive to said means for comparing said one of said plurality of test-template distances against said one of said plurality of template-template distances.

16. Apparatus as in claim 15, wherein
said associative memory comprises a discrete Hopfield artificial neural network weight matrix stored in a memory coupled to said processor, said neural network having a set of weights defined in response to said template descriptors; and said means for comparing comprises means for inputting said test descriptor to said neural network, and means for generating an output from said neural network.

17. Apparatus as in claim 15, wherein said means for selecting one of said plurality of test-template distances is disposed for selecting a minimum thereof.

18. Apparatus as in claim 15, wherein said means for comparing generates a signal verifying said test handwritten signature if said selected one of said test-template distances is less than or equal to said selected one of said template-template distances.

19. Apparatus as in claim 15, comprising a database associating a set of authorization privileges with at least one said template signature; and means for accessing said database responsive to said step of comparing.

20. Apparatus as in claim 15, comprising a memory storing a plurality of first data structures, each representative of movements of a writing instrument for one of said template signatures;

said processor comprising means for identifying a relative rotation of each one of said template signatures; and said processor comprising means for altering each one of said first data structures responsive to said means for identifying.

21. Apparatus as in claim 15, comprising a memory storing a second data structure representative of movements of a writing instrument for said test signature;

said processor comprising means for identifying a relative rotation of said test signature; and said processor comprising means for altering said second data structure responsive to said means for identifying.

22. Apparatus as in claim 15, comprising a memory storing a plurality of first data structures, each representative of movements of a writing instrument for one of said template signatures;

said processor comprising means for dividing said first data structure into a plurality of segments;

said processor comprising means for computing a measure of dispersion for each said segment;

said processor comprising means for defining, for a first said segment, a set of retained pixels less than all pixels in said first segment, responsive to said measure of dispersion for said first segment;

said processor comprising means for computing a regression line responsive to said retained pixels; and said processor comprising means for rotating said first signature responsive to said regression line.

23. Apparatus as in claim 15, wherein each one of said template signatures comprises a plurality of pixels, each said pixel having spatial information associated therewith;

said processor comprises means for determining a measure of physical size for each one of said template signatures; and said processor comprises means for altering said spatial information for each said pixel so that said measure is substantially equal for each one of said template signatures.

24. Apparatus as in claim 15, wherein each said template descriptor comprises a binary vector having less than 2400 bits of information.

25. A method of handwritten signature verification, comprising the steps of receiving a plurality of handwritten template signatures;

generating a template feature vector for each one of said template signatures;

determining a template-template distance between each pair of said template feature vectors;

selecting one of said template-template distances in response to a statistical measure of said template-template distances;

storing said template feature vectors in an associative memory;

receiving a handwritten test signature;

generating a test feature vector for said test signature;

generating a derived feature vector in response to said associative memory and said test feature vector;

determining a test-template distance between said derived feature vector and each one of said template feature vectors;

selecting one of said plurality of test-template distances;

verifying said test signature in response to a comparison of said selected one of said test-template distances and said selected one of said inter-template distances.

26. A method as in claim 25, wherein said step of storing said template feature vectors in an associative memory comprises the step of training a neural network using said template feature vectors; and said step of generating a derived feature vector comprises the step of inputting said test feature vector to said neural network.

27. A method as in claim 25, wherein said statistical measure is a ranking within said plurality of template-template distances.

28. A method as in claim 25, wherein said step of storing comprises the steps of constructing a bit vector for each said template feature vector, and defining a set of weights for a discrete Hopfield artificial neural network weight matrix, responsive to each said bit vector; and said step of comparing comprises the steps of inputting said test feature vector to said discrete Hopfield artificial neural network, and generating an output from said discrete Hopfield artificial neural network.

29. A method as in claim 28, wherein said step of defining a set of weights comprises unsupervised training of a neural network.

30. Apparatus for determining whether a first person is a particular individual, said apparatus comprising a first memory including a template descriptor for each of a plurality of template signatures of the particular individual, and a plurality of template-template distances between each pair of said template descriptors;

a second memory including a test descriptor for a test signature made on a signature transducer by said first person;

an associative memory, said associative memory disposed for storing each of said template descriptors, for being addressed using said test descriptor, and for retrieving an derived descriptor different from said test descriptor;

a third memory including a plurality of test-template descriptors between said derived descriptor and each one of said template descriptors;

a processor coupled to said first memory, said second memory, and said third memory and disposed for comparing a selected one of said test-template distances with a selected one of said template-template distances other than a maximum thereof; and means for displaying a match only if said said selected test-template distance is less than of said selected template-template distance.

31. Apparatus as in claim 30, wherein said selected test-template distance is a minimum thereof.

32. Apparatus as in claim 30, wherein said selected template-template distance is responsive to a rank ordering thereof.

* * * * *